United States Patent
Kim et al.

(10) Patent No.: US 9,994,086 B2
(45) Date of Patent: Jun. 12, 2018

(54) MAIN SEMICONDUCTOR DEVICE FOR CONTROLLING AIR CONDITIONER, AND AIR CONDITIONER OF VEHICLE SYSTEM HAVING THE SAME

(71) Applicants: Hyundai Motor Company, Seoul (KR); Kia Motors Corporation, Seoul (KR)

(72) Inventors: Jin Kim, Suwon (KR); Yongwook Kwon, Seoul (KR); Sukyoung Rho, Anyang (KR); Junekyu Park, Hwaseong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 588 days.

(21) Appl. No.: 14/547,541

(22) Filed: Nov. 19, 2014

(65) Prior Publication Data

US 2016/0059665 A1   Mar. 3, 2016

(30) Foreign Application Priority Data

Aug. 27, 2014 (KR) .................. 10-2014-0112625

(51) Int. Cl.
  *B60H 1/00* (2006.01)
(52) U.S. Cl.
  CPC ..... *B60H 1/00964* (2013.01); *B60H 1/00971* (2013.01)
(58) Field of Classification Search
  CPC .................................................. B60H 1/0065
  USPC ........................................................ 318/3, 34
  See application file for complete search history.

(56) References Cited

U.S. PATENT DOCUMENTS

| 5,595,064 A * | 1/1997 | Ikeda ................. B60H 1/00392 180/65.1 |
| 5,764,022 A * | 6/1998 | Kazama ............... H02M 5/458 318/801 |
| 8,004,221 B2 * | 8/2011 | Nakano ............. B60H 1/00428 318/139 |

FOREIGN PATENT DOCUMENTS

| JP | 2004-284397 A | 10/2004 |
| KR | 10-2004-0085721 A | 10/2004 |
| KR | 2008-0072227 A | 8/2008 |
| KR | 2010-0134434 A | 12/2010 |
| KR | 10-1448775 B1 | 10/2014 |

* cited by examiner

Primary Examiner — David S Luo
(74) Attorney, Agent, or Firm — Mintz Levin Cohn Ferris Glovsky and Popeo, P.C.; Peter F. Corless

(57) ABSTRACT

A main semiconductor device for controlling an air conditioner provided in a vehicle and selectively connected to an air-conditioning panel semiconductor that controls an air-conditioning panel may include: an analog circuit unit and a digital circuit unit, an input module receiving sensor information for controlling the air conditioner, a motor driving module driving one or more motors provided in the air conditioner, a voltage regulator module regulating a voltage supplied to each module of the main semiconductor device, and a control module controlling the motor driving module based on the sensor information received by the input module, and constantly supplying a voltage to each module of the main semiconductor device by controlling the voltage regulator module.

11 Claims, 3 Drawing Sheets

Related Art

MAIN SEMICONDUCTOR DEVICE FOR CONTROLLING AIR CONDITIONER, AND AIR CONDITIONER OF VEHICLE SYSTEM HAVING THE SAME

CROSS-REFERENCE TO RELATED APPLICATION

This application claims priority to and the benefit of Korean Patent Application No. 10-2014-0112625 filed in the Korean Intellectual Property Office on Aug. 27, 2014, the entire contents of which are incorporated herein by reference.

BACKGROUND (a) Technical Field

The present disclosure relates to a main semiconductor device for controlling an air conditioner, and an air conditioner system of vehicle having the same. More particularly, the present disclosure relates to a main semiconductor device to minimize package size and reduce a development period through common use and standardization of parts.

(b) Description of the Related Art

Air-conditioning controllers for vehicles of the related art are configured by combining a panel with a main controller and using analog parts and digital parts for different types of vehicles. For example, FIG. 1 is a block diagram showing the configuration of integrating an liquid crystal display (LCD) panel controller and a main controller for a customary type of vehicle.

As shown in FIG. 1, the air-conditioning controller for a vehicle of the related art is composed of an LCD driver, a micro computer (MICOM), a motor driver, and an low drop output (LDO) regulator, a controller area network (CAN) driver, and other analog transceivers. The controller controls a motor in an air-conditioning duct, displays an image on an LCD display window, and controls engine loads by transmitting/receiving various items of information to/from an engine engine control unit (ECU) and a cluster through CAN communication.

However, it is too expensive and time consuming to develop a new air-conditioning controller for each type of vehicle, and there is a problem in that the number of types of air-conditioning controllers for the different types of vehicles is rapidly increasing. Further, using an integral controller suffers from a deficit of package space due to an increase in size of the controller, and there is a problem in that the functions increase due to quality enhancement of the specifications for the types of vehicles, such that the number of parts and interface circuits increases, and thus the controller increases in size.

The above information disclosed in this Background section is only for enhancement of understanding of the background of the disclosure, and therefore it may contain information that does not form the related art that is already known to a person of ordinary skill in the art.

SUMMARY

The present disclosure has been made in an effort to provide a main semiconductor device for controlling an air conditioner based on an architecture by integrating an analog semiconductor, such as a motor driving module and a voltage regulator module, and a digital semiconductor such as a control module and a watchdog module, which are included in a main semiconductor device for controlling an air conditioner.

A main semiconductor device for controlling an air conditioner provided in a vehicle and selectively connected to an air-conditioning panel semiconductor that controls an air-conditioning panel may include: an analog circuit unit and a digital circuit unit; an input module receiving sensor information for controlling the air conditioner; a motor driving module driving one or more motors provided in the air conditioner; a voltage regulator module regulating a voltage supplied to each module of the main semiconductor device; and a control module controlling the motor driving module based on the sensor information received by the input module, and constantly supplying a voltage to each module of the main semiconductor device by controlling the voltage regulator module.

The main semiconductor device for controlling an air conditioner may further include a communication module electrically connected with the air-conditioning panel semiconductor.

The communication module may receive air-conditioning condition setting and operation signals, including an air-conditioning setting signal and a function operation signal, from the air-conditioning panel through an operating unit of the air-conditioning panel, and transmit signals detected by an operation of the air conditioner to the air-conditioning panel.

The main semiconductor device may selectively receive the air-conditioning condition setting and operation signals from the input module or the communication module according to a type of the air conditioner provided in the vehicle.

The main semiconductor device may directly receive the air-conditioning condition setting and operation signals from a driver through the input module when the air conditioner is a manual air conditioner, and the main semiconductor device may receive the air-conditioning condition setting and operation signals through the communication module when the air conditioner is an automatic air conditioner.

The main semiconductor device for controlling an air conditioner may further include a watchdog module checking an error of the control module through a watchdog timer, and restarting the analog circuit unit and the digital circuit unit by re-supplying power to the analog circuit unit and the digital circuit unit after stopping the power for a predetermined time.

The main semiconductor device for controlling an air conditioner may further include a controller area network (CAN) communication module transmitting and receiving signals to and from an engine management system (EMS) and an audio video navigation (AVN) system of the vehicle, wherein the control module controls the motor driving module based on the signals received by the CAN communication module.

The main semiconductor device for controlling an air conditioner may further include a serial peripheral interface (SPI) module performing communication by connecting each module provided in the analog circuit unit to each module provided in the digital circuit unit.

The main semiconductor device for controlling an air conditioner may further include a logic module controlling the SPI module, and transmitting an interrupt signal generated at the analog circuit unit and status information of the analog circuit unit to the control module.

The communication module may be a local interconnection network (LIN) communication module.

An air conditioner for a vehicle according to embodiments of the present disclosure may include the main semiconductor device for controlling the air conditioner, as described above.

According to embodiments of the present disclosure, since the main semiconductor device based on architecture is provided by integrating the analog semiconductor and the digital semiconductor, a size of an air-conditioning control package for a vehicle is minimized, and a manufacturing cost can be reduced through common use and standardization of hardware and software. Further, since the main semiconductor device and the panel semiconductor are physically separated and transmit/receive various data through LIN communication, it is possible to solve the problem of a deficit of package space due to integration of an air-conditioning switch panel and a controller. Further, since air-conditioning condition setting and operation signals are received through the input module or the LIN communication module, according to a type of the air conditioner provided in the vehicle, the main semiconductor device can be widely used.

BRIEF DESCRIPTION OF THE DRAWINGS

The attached drawings illustrate exemplary modes of the present disclosure, and are provided for describing the present disclosure in more detail, but not for limiting technical aspects of the present disclosure.

DETAILED DESCRIPTION OF THE EMBODIMENTS

Figure 1:
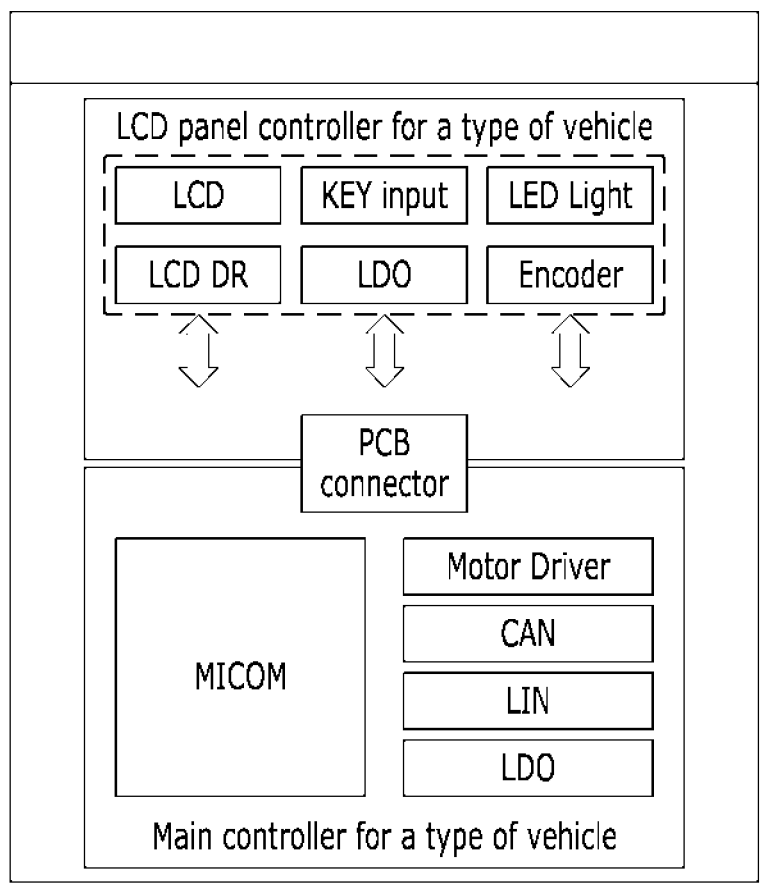
FIG. 1 is a block diagram showing the configuration of integrating an LCD panel controller and a main controller for a type of vehicle of the related art.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification. In addition, the size and thickness of each configuration shown in the drawings are arbitrarily shown for better understanding and ease of description, but the present disclosure is not limited thereto. In the drawings, the thickness of layers, films, panels, regions, etc., are exaggerated for clarity.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, a main semiconductor device 200 for controlling air conditioner according to embodiments of the present disclosure will be described in detail with reference to accompanying drawings.

Figure 2:
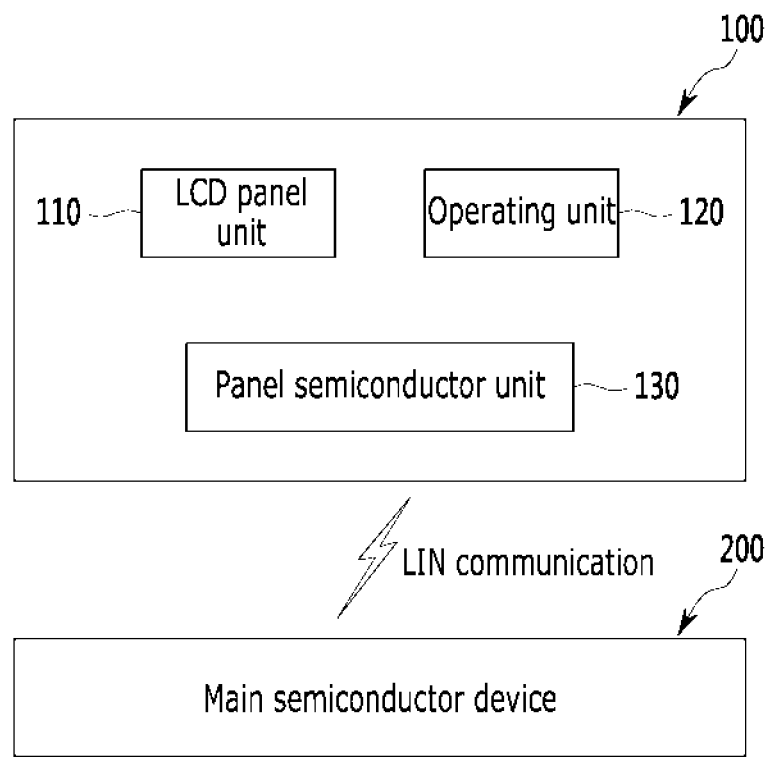
FIG. 2 is a block diagram schematically showing an air-conditioning system for a vehicle according to embodiments of the present invention.

FIG. 2 is a block diagram schematically showing an air-conditioning system for a vehicle according to embodiments of the present disclosure. As shown in FIG. 2, an air conditioner for a vehicle according to the present disclosure includes an air-conditioning panel semiconductor 100 and the main semiconductor device 200. The air-conditioning panel semiconductor 100 receives setting information and a function operation for controlling the air conditioner, and displays a state of the air conditioner according to the setting information and function operation.

The air-conditioning panel semiconductor 100 includes an LCD panel unit, an operating unit, and a panel semiconductor unit. The LCD panel unit 110 displays the overall state information according to the operation of the air conditioner for a vehicle, through an LCD screen. The LCD panel unit 110 can display the information on various operation modes, temperature setting information about air-conditioning control, and information on temperature measured outside.

The operating unit 120 includes various operation sets for controlling operation of the air-conditioning, such as at least one encoder switch and a button switch. The operating unit 120 receives condition setting and function operation signals for vehicle air-conditioning control from a user. For example, the operating unit 120 may include a temperature control switch for setting a desired temperature inside a vehicle, an airflow control switch for setting the amount of air to be blown by a fan, an air conditioner switch for setting operation stoppage of an air conditioner (e.g., a compressor), an internal/external air switch for setting the flow of the air inside a vehicle and the external air, a discharge mode switch for changing the discharge mode of air, a defrost switch for removing moisture from the windows of a vehicle, an auto switch for setting the automatic control state of the air conditioner, and the so forth as would be understood by one of ordinary skill in the art.

The panel semiconductor unit 130 is implemented in an integrated semiconductor only for an air-conditioning panel by integrating the analog semiconductor and the digital semiconductor of an air-conditioning panel. That is, the panel semiconductor unit 130 may be implemented in an integral unit by integrating a low drop output regulator (LDO) that is an existing single semiconductor, an LCD driver (DR), a LIN transceiver (TR), and a MICOM.

The main semiconductor device 200 controls the air conditioner that heats or cools air flowing into the vehicle according to a type of the air conditioner provided in the vehicle. If the air conditioner is a manual air conditioner (MTC: manual temperature control), the main semiconductor device 200 directly receives the air-conditioning condition setting and operation signals from a driver without using the air-conditioning panel semiconductor 100, and controls the air conditioner. That is, since the air-conditioning panel semiconductor is not provided in the vehicle when the air conditioner is the manual air conditioner, air-conditioning condition setting and operation signals are directly received by an input module 220 of the main semiconductor device 200.

If the air conditioner is an automatic air conditioner (ATC: auto temperature control air-conditioner), the main semiconductor device 200 receives the air-conditioning condition setting and operation signals of the driver from the air-conditioning panel semiconductor 100 connected by the LIN communication, and controls the air conditioner. At this time, the main semiconductor device 200 generally controls the function of transmitting the information on driving of the air conditioner to other systems in a vehicle which are operated in connection with the driving of the air conditioner and information detected in the process of controlling the air conditioner.

Hereinafter, the main semiconductor device according to embodiments of the present disclosure will be described in detail.

Figure 3:
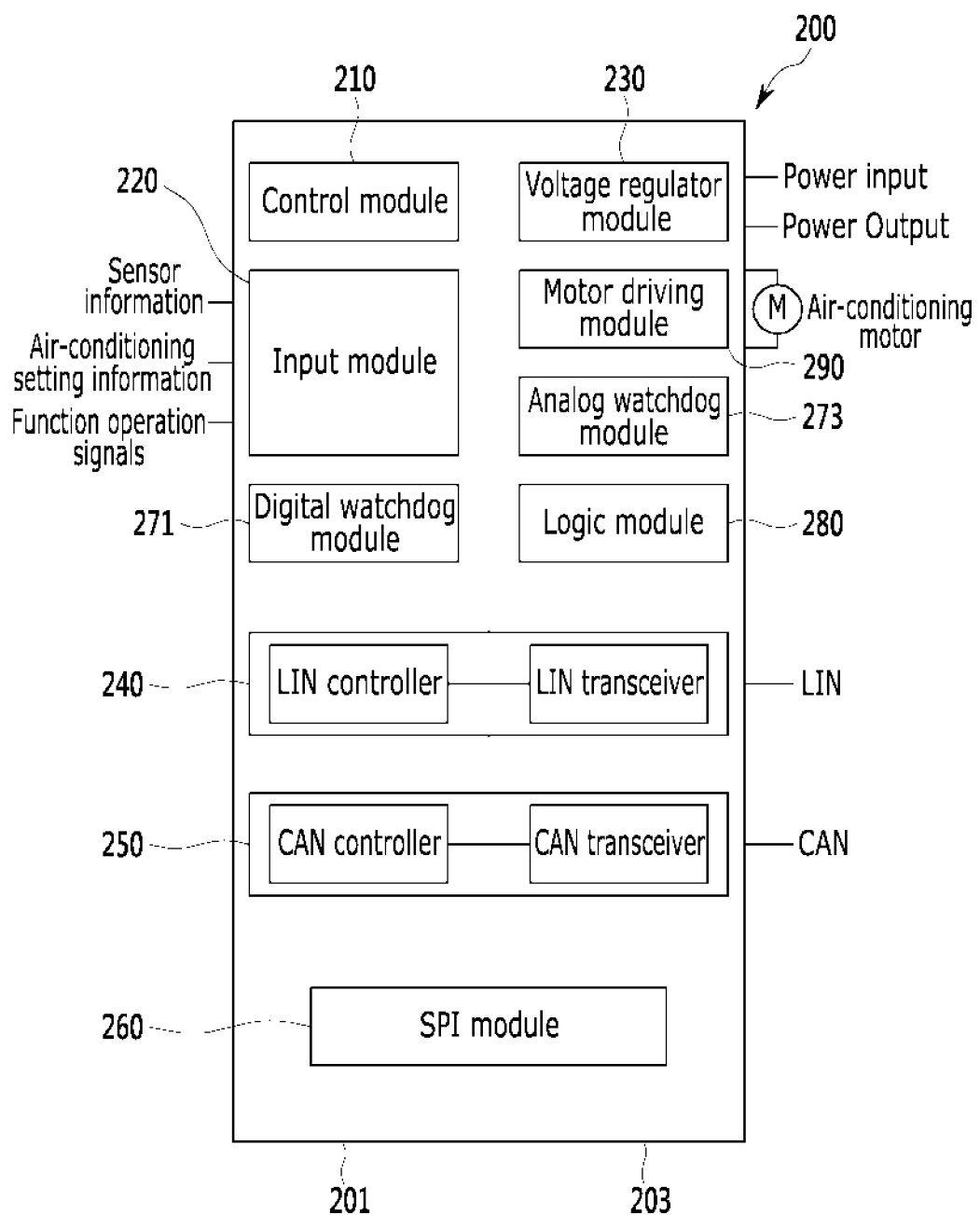
FIG. 3 is a block diagram showing the configuration of a main semiconductor device according to embodiments of the present invention.

FIG. 3 is a block diagram showing the configuration of a main semiconductor device according to embodiments of the present disclosure. As shown in FIG. 3, the main semiconductor device according to the present disclosure includes a control module 210, an input module 220, a voltage regulator module 230, a motor driving module 290, a LIN communication module 240, a CAN communication module 250, an SPI module 260, a logic module 280, and watchdog modules 271 and 273.

The main semiconductor device 200 is divided into an analog circuit unit 203 and a digital circuit unit 201. The control module 210 and the input module 220 are provided in the digital circuit unit 201. The voltage regulator module 230 and the motor driving module are provided in the analog circuit unit 203.

The input module 220 receives sensor information for controlling the air conditioner, or air-conditioning condition setting and function operation signals. The input module 220 is provided in the digital circuit unit. The sensor information includes an external/internal temperature sensor, a humidity sensor, a defog sensor, an air quality sensor (AQS), and a photo sensor. The air-conditioning condition setting and function operation signals are information for setting the air conditioner by an operation of the driver, and the information includes on/off of the air conditioner, wind strength, and temperature.

If the air conditioner provided in the vehicle is the manual air conditioner (MTC: manual temperature control), the main semiconductor device 200 receives sensor information and air-conditioning condition setting and function operation signals through the input module 220. However, if the air conditioner provided in the vehicle is the automatic air conditioner (ATC: automatic temperature control), the main semiconductor device 200 receives only sensor information through the input module 220.

The LIN communication module 240 receives the air-conditioning condition setting information and function operation signals inputted from the operating unit through communication with the air-conditioning panel semiconductor 100, and transmits detected information according to operation of the air conditioner to the air-conditioning panel semiconductor 100. The LIN communication module 240 includes a LIN transceiver for transmitting and receiving various data and a LIN controller for controlling the LIN transceiver. The LIN transceiver is provided in the analog circuit unit, and the LIN controller is provided in the digital circuit unit. The LIN communication module 240 can minimize current consumption through a standby mode. For example, the control module 210 integrally manages standby management functions of the LIN communication module 240, can perform wakeup, and it can control the current according to the standby mode and the wakeup in detail. If the air conditioner provided in the vehicle is the automatic air conditioner (ATC), the main semiconductor device 200 receives air-conditioning condition setting and function operation signals from the air-conditioning panel semiconductor 100 through the LIN communication module 240.

The voltage regulator module 230 serves to stabilize power for the modules in the main semiconductor device 200 into uniform output by regulating the power at a constant voltage in accordance with control of the control module 210 regardless of a load current, an input voltage, and the surrounding temperature. The voltage regulator module 230 is provided in the analog circuit unit.

The CAN communication module 250 transmits/receives various signals with an engine management system (EMS) and an audio video navigation (AVN) system provided in the vehicle. The CAN communication module 250 includes a CAN transceiver transmitting/receiving various data and a CAN controller controlling the CAN transceiver. The CAN transceiver is provided in the analog circuit unit, and the CAN controller is provided in the digital circuit unit.

The control module 210 controls the air conditioner by using signals received from the EMS and the ANV system. For example, the control module 210 controls the air conditioner according to an engine load received from the EMS. That is, the control module 210 lowers air-conditioning performance of the air conditioner when the engine load is high and heightens the air-conditioning performance of the air conditioner when the engine load is low. When the AVN system performs a voice recognition function, the control module 210 reduces wind strength generated by the air conditioner.

The watchdog modules 271 and 273 sense an error by checking whether the control module 210 normally operates, through a watchdog timer. If there is an error in the control module 210, the watchdog modules 271 and 273 restart the analog circuit unit and the digital circuit unit by re-supplying power to the analog circuit unit and the digital circuit unit after stopping the power for a predetermined time. The watchdog modules include an analog watchdog module 273 provided in the analog circuit unit and a digital watchdog module 271 provided in the digital circuit unit.

The analog watchdog module 273 and the digital watchdog module 271 can perform initialization by deleting the information causing an error in the volatile memory in the control module 210, and restart the analog circuit unit and the digital circuit unit by re-supplying power after cutting the power for a predetermined time in accordance with an initializing program.

The serial peripheral interface (SPI) module 260 performs communication by connecting each module provided in the analog circuit unit with each module provided in the digital circuit unit. The logic module 280 provided in the analog circuit unit controls the SPI module 260 and transmits an interrupt signal generated at the analog circuit unit to the control module 210. The logic module 280 transmits status information of each module provided in the analog circuit unit to the control module 210.

As described above, according to embodiments of the present disclosure, since the main semiconductor device based on architecture is provided by integrating the analog semiconductor and the digital semiconductor, the size of an air-conditioning control package for a vehicle is minimized, and the manufacturing cost can be reduced through common use and standardization of hardware and software. Further, the air semiconductor device selectively receives air-conditioning condition setting and operation signals from the input module or the communication module, according to the type of air conditioner. Therefore, manufacturing cost can be reduced by common use of the main semiconductor device 200.

DESCRIPTION OF SYMBOLS

100: air-conditioning panel semiconductor
200: main semiconductor device
210: control module
220: input module
230: voltage regulator module
240: LIN communication module
250: CAN communication module
260: SPI module
271, 273: watchdog module
280: logic module While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A main semiconductor device for controlling an air conditioner provided in a vehicle, the main semiconductor device comprising:
   an analog circuit unit and a digital circuit unit;
   an input module receiving sensor information for controlling the air conditioner;
   a motor driving module driving one or more motors provided in the air conditioner;
   a voltage regulator module regulating a voltage supplied to each module of the main semiconductor device; and
   a control module controlling the motor driving module based on the sensor information received by the input module, and constantly supplying a voltage to each module of the main semiconductor device by controlling the voltage regulator module,
   wherein the main semiconductor device is selectively connected to an air-conditioning panel semiconductor that controls an air-conditioning panel.

2. The main semiconductor device for controlling an air conditioner of claim 1, further comprising
   a communication module electrically connected with the air-conditioning panel semiconductor.

3. The main semiconductor device for controlling an air conditioner of claim 2,
   wherein the communication module receives air-conditioning condition setting and operation signals, including an air-conditioning setting signal and a function operation signal, from the air-conditioning panel through an operating unit of the air-conditioning panel, and transmits signals detected by an operation of the air conditioner to the air-conditioning panel.

4. The main semiconductor device for controlling an air conditioner of claim 3,
   wherein the main semiconductor device selectively receives the air-conditioning condition setting and operation signals from the input module or the communication module according to a type of the air conditioner provided in the vehicle.

5. The main semiconductor device for controlling an air conditioner of claim 4,
   wherein the main semiconductor device directly receives the air-conditioning condition setting and operation signals from a driver through the input module when the air conditioner is a manual air conditioner, and
   the main semiconductor device receives the air-conditioning condition setting and operation signals through the communication module when the air conditioner is an automatic air conditioner.

6. The main semiconductor device for controlling an air conditioner of claim 2,
   wherein the communication module is a local interconnection network (LIN) communication module.

7. The main semiconductor device for controlling an air conditioner of claim 1, further comprising
   a watchdog module checking an error of the control module through a watchdog timer, and restarting the analog circuit unit and the digital circuit unit by re-supplying power to the analog circuit unit and the digital circuit unit after stopping the power for a predetermined time.

8. The main semiconductor device for controlling an air conditioner of claim 1, further comprising
   a controller area network (CAN) communication module transmitting and receiving signals to and from an engine management system (EMS) and an audio video navigation (AVN) system of the vehicle,
   wherein the control module controls the motor driving module based on the signals received by the CAN communication module.

9. The main semiconductor device for controlling an air conditioner of claim 1, further comprising
   a serial peripheral interface (SPI) module performing communication by connecting each module provided in the analog circuit unit to each module provided in the digital circuit unit.

10. The main semiconductor device for controlling an air conditioner of claim 9, further comprising
    a logic module controlling the SPI module, and transmitting an interrupt signal generated at the analog circuit unit and status information of the analog circuit unit to the control module.

11. An air conditioner for a vehicle, comprising:
    a main semiconductor device for controlling the air conditioner that is selectively connected to an air-conditioning panel semiconductor, wherein the main semiconductor device comprises:
    an analog circuit unit and a digital circuit unit;
    an input module receiving sensor information for controlling the air conditioner;
    a motor driving module driving one or more motors provided in the air conditioner;
    a voltage regulator module regulating a voltage supplied to each module of the main semiconductor device; and
    a control module controlling the motor driving module based on the sensor information received by the input module, and constantly supplying a voltage to each module of the main semiconductor device by controlling the voltage regulator module.

* * * * *